United States Patent
Michishita

(10) Patent No.: US 6,442,309 B1
(45) Date of Patent: Aug. 27, 2002

(54) OPTICAL AMPLIFIER

(75) Inventor: Yukio Michishita, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/436,577

(22) Filed: Nov. 9, 1999

(30) Foreign Application Priority Data

Nov. 11, 1998 (JP) .......................................... 10-319706

(51) Int. Cl.[7] .............................................. G02B 6/26
(52) U.S. Cl. ...................................................... 385/27
(58) Field of Search ................................ 359/341, 333, 359/347, 107, 184; 372/6, 27, 69, 71; 385/14, 27, 42, 44

(56) References Cited

U.S. PATENT DOCUMENTS

| 5,367,587 A | * 11/1994 | Mizuochi et al. | 385/27 |
| 5,495,362 A | * 2/1996 | Takatu et al. | 359/333 |
| 5,561,552 A | * 10/1996 | Shibuya | 359/341 |

FOREIGN PATENT DOCUMENTS

| JP | 03-100527 | * 4/1991 | |
| JP | 3-100527 | 4/1991 | |
| JP | 04-025825 | * 1/1992 | 385/27 |
| JP | 4-86727 | 3/1992 | |
| JP | 4-93091 | 3/1992 | |
| JP | 4-361583 | 12/1992 | |
| JP | 5-206555 | 8/1993 | |
| JP | 5-315692 | 11/1993 | |
| JP | 8-8832 | 1/1996 | |

* cited by examiner

*Primary Examiner*—Akm E. Ullah
(74) *Attorney, Agent, or Firm*—Dickstein, Sharpiro Morin & Oshinsky LLP

(57) ABSTRACT

A light amplifier is provided which is capable of maintaining the output light of excitation light sources at a constant level even when the light power input into the rare earth containing optical fiber fluctuates due to the tracking error of the excitation light source or due to the temperature characteristic or the polarization dependence of the excitation light multiplexer. The light passed through the rare earth containing optical fiber is extracted after being split by the splitting device 3, and output levels of the excitation light sources and are controlled by a control circuit in response to the levels of the extracted light. Consequently, the light output can be maintained at a constant level even when the excitation light power input into the optical fiber fluctuates due to the polarization dependence or the temperature characteristic of the light multiplexer for supplying the excitation light into the optical fiber.

10 Claims, 4 Drawing Sheets

OPTICAL AMPLIFIER

BACKGROUND OF THE INVENTION

1. Field of the Invention

The present invention relates to an optical amplifier, and particularly relates to an optical amplifier which uses an optical fiber containing a rare earth additive.

2. Background Art

An example showing a structure of such an optical amplifier is depicted in FIG. 7. A input port 1 is connected to an optical fiber 2 containing the rare earth additive, the output portion of the optical fiber 2 is connected to a port #1 of an optical multiplexing and splitting device 3, and the port #2 of the optical multiplexing and splitting device 3 is connected to the output port 4. The port #3 of the optical multiplexing and splitting device 3 is connected with an excitation light multiplexer 5, and two excitation light sources 6A and 6B having respective light receivers 7A and 7B are connected to the excitation light multiplexer 5.

The light input from the input port 1 is amplified by the optical fiber containing a rare earth additive which is in the excitation state due to the excitation light from the excitation light sources 6A and 6B. Since the amplification factor at this type of amplification changes with the quantity of the excitation light emitted from the excitation light source, the light output fluctuates when the quantity of the excitation light fluctuates. Thus, an excitation light fixing control system is adopted, which controls the respective outputs of excitation light sources 6A and 6B by an control circuit such that light quantities received by respective light receivers 7A and 7B of the excitation light sources 6A and 6B are constant.

As shown in FIG. 7, two excitation light sources 6A and 6B are provided in order to increase the output power of the excitation light and also to improve the reliability of the system by driving another source if one source is damaged.

In the conventional structure shown in FIG. 7, 9 problems arise, as shown above, that the output level of the excitation light fluctuates when the actual input of the excitation light power into the optical fiber including the rare earth element fluctuates due to the tracking error of the excitation light sources 6A and 6B, or due to the polarization light dependence and the temperature characteristic of the excitation light multiplexer 5 or the like.

SUMMARY OF THE INVENTION

It is therefore an object of the present invention to provide an optical amplifier which is capable of maintaining the excitation light output at a constant level even if the excitation light input into the optical fiber containing the rare earth element fluctuates due to the tracking error of the excitation light sources, or due to the polarization dependence and the temperature characteristic of the excitation light multiplexer or the like.

According to the first aspect of the present invention, a light amplifier comprising: a optical fiber containing a rare earth additive; a plurality of excitation light sources for generating excitation light beams for said optical fiber; an excitation light multiplexing and splitting means for splitting an excitation light beam supplied into said optical fiber after multiplexing said plurality of excitation light beams and after passing through said optical fiber; a control means for controlling the output level of each excitation light sources in response to the excitation light beam split by said excitation light multiplexing and splitting means.

The light amplifier of the present invention has a feature that said excitation light multiplexing and splitting means is disposed at the output portion of said optical fiber, or disposed at the input portion of said optical fiber. Furthermore, this invention comprises a pair of excitation light sources and a light multiplexing means for multiplexing said pair of light beams emitted from said pair of light emitting sources . In addition, the light amplifier comprises a plurality of sets of a combination of the light emission sources and said light multipexer.

The light amplifier of the present invention has a feature that the light multiplexing and splitting device is separated into a light multiplexing portion and a light splitting portion, wherein the light multiplexing portion is disposed at the output portion of the optical fiber and the light splitting portion is disposed at the input portion of the optical fiber. The other feature is that said excitation light multiplexing and splitting device is separated into a light multiplexing portion and a light splitting portion, wherein the light multiplexing portion is disposed at the input portion of the optical fiber, and the light splitting portion is disposed at the output portion of the optical fiber. In the present invention, the pair of excitation light sources emits respective light beams having an identical wavelength and both excitation beams are multiplexed by a polarization composition such that neither polarizing planes interferes with the other. The plurality of sets of a pair of the excitation light sources emits excitation light beams having different wavelength from the others in the absorption band of the optical fiber so as not to influence each other.

The operation of the present invention is as follows. The light amplifier is constituted such that the output level of the excitation light beams is controlled in response to the level of the excitation light beams extracted as split beams after passing through the rare earth containing optical fiber. Thus, the light output can be controlled at a constant level even if the excitation light power fluctuates due to the tracking error of the excitation light sources 6A and 6B, or due to the polarization light dependence and the temperature characteristic of the light multiplexer for supplying the excitation light into the rare earth containing optical fiber.

DETAILED DESCRIPTION OF THE INVENTION

Figure 1:
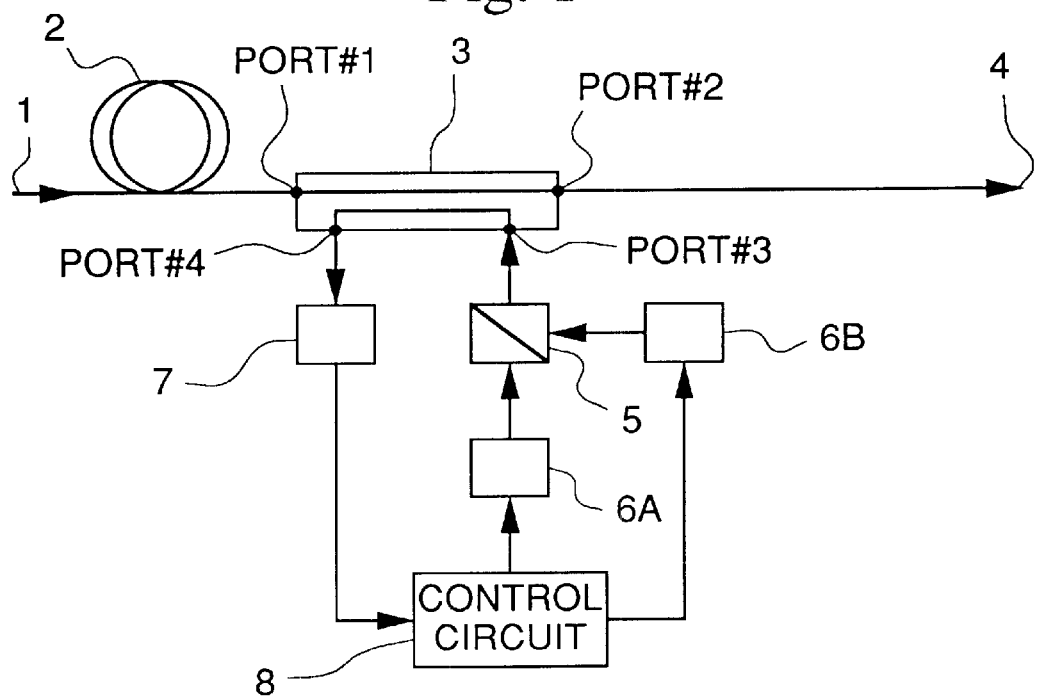
FIG. 1 is a block diagram showing one embodiment according to the present invention.
Figure 7:
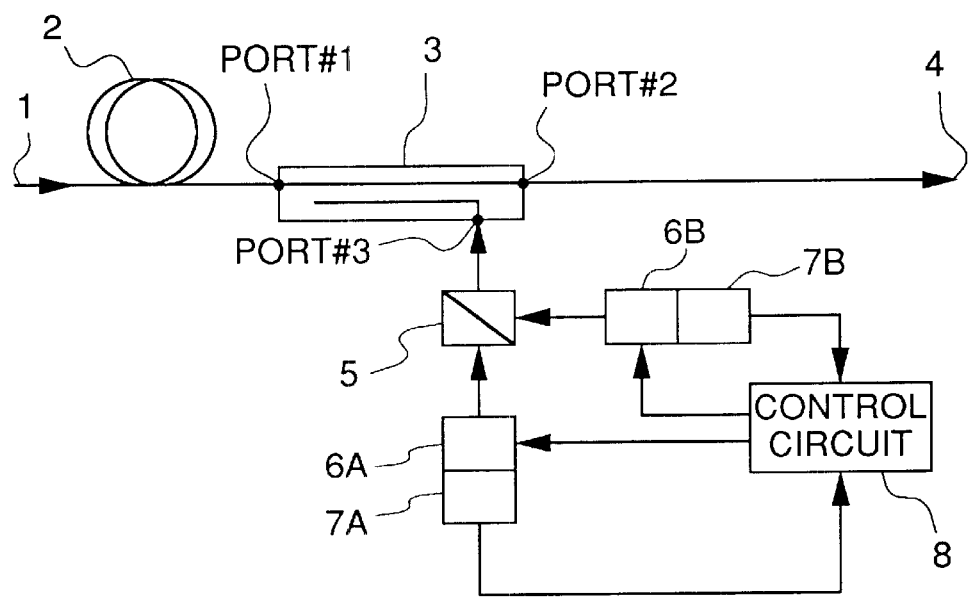
FIG. 7 is a block diagram showing a conventional example.

Referring to the attached figures, several embodiments of the present invention will be described hereinafter. FIG. 1 illustrates a block diagram of an essential embodiment according to the present invention, and the same reference numerals denote the same components as those shown in FIG. 7. As shown in FIG. 1, an input of the optical fiber 2 containing a rare earth element as an additive is connected to an input port 1 and the output of the optical fiber 2 is connected to #1 port of an optical multiplexing and splitting device 3 and the #2 port of the optical multiplexing and splitting device 3 is connected to the output port 4. That is, the output of the said rare earth containing optical fiber 2 is connected to the output port 4 through the optical multiplexing and splitting device 3.

The excitation light beams from a pair of excitation light sources 6A and 6B are multiplexed by the excitation light multiplexer 5 and supplied to the #3 port of the optical multiplexing and splitting device 3. The split excitation light beams are received by a light receiver 7 and supplied to a control circuit 8 after converted into an electric signals. This control circuit 8 controls each excitation light beam from the excitation light sources 6A and 6B such that the electric signal from the receiving device 7 is maintained at a constant level.

Since such a structure of the light amplifier allows the light receiver 7 to monitor the power level of the excitation light passed through the excitation light multiplexer 5 and the optical multiplexing and splitting device 3, it becomes possible to maintain the output at constant level, even when the power level of the excitation light to be supplied to the optical fiber containing rare earth fluctuates due to the polarization dependence or the temperature characteristic of the excitation light multiplexer 5 used for supplying the excitation light into the optical fiber containing rare earth elements and the excitation light splitting device 3.

Figure 2:
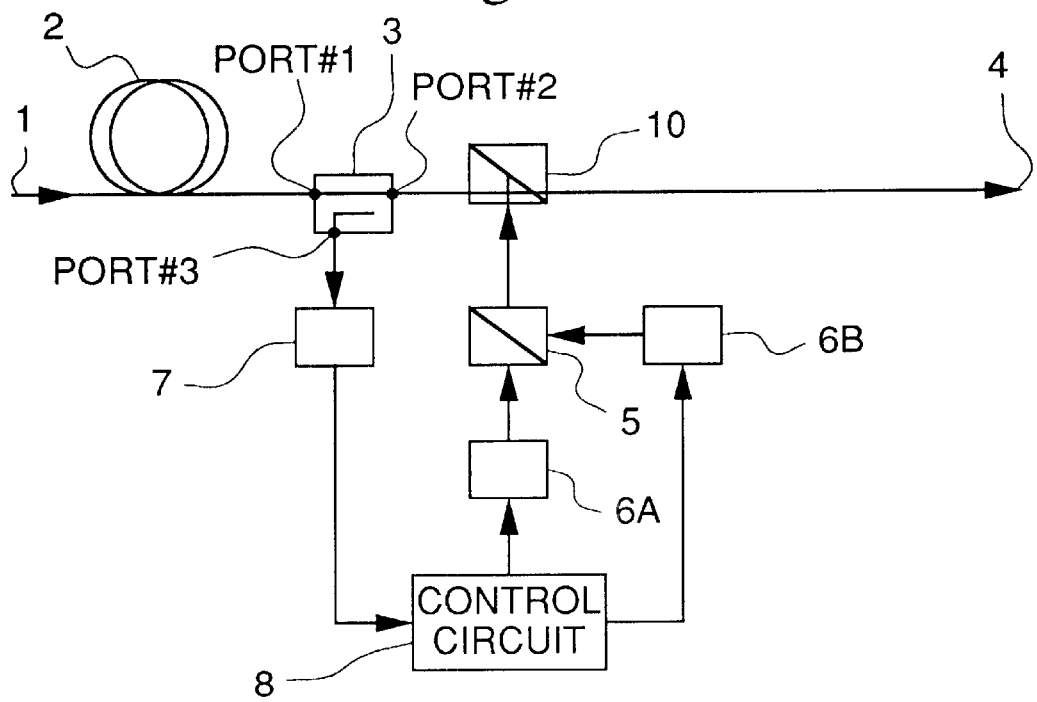
FIG. 2 is a block diagram showing the first embodiment according to the present invention.

FIG. 2 is a diagram showing the first embodiment according to the present invention, and the same elements shown in FIG. 2 are denoted by the same reference numerals as those shown in FIG. 1. The input port 1 is connected to the input portion of the rare earth containing optical fiber 2 and the output portion of the optical fiber 2 is connected to the #1 port of the excitation light multiplexing and splitting device 3, and the #2 port of the excitation light multiplexing and splitting device 3 is connected with the input of the excitation light multiplexer 10 and the output of the excitation light multiplexer 10 is connected with the output port 4.

Furthermore, the excitation light input port of the excitation light multiplexer 10 is connected to the excitation light multiplexer 5, and both excitation light sources 6A and 6B are connected to the excitation light multiplexer 5. The light receiver 7 is connected to the #3 port of the excitation light multiplexing and splitting device 3 and the output of the light receiver 7 is connected with the excitation light source control circuit 8, such that the excitation light sources 6A and 6B are controlled by the excitation light source control circuit 8. An example of the excitation light sources 6A and 6B is a LD (Laser Diode), and an example of the excitation light multiplexer 5 is a PBS (Polarization Beam Splitter).

The operation of the first embodiment according to the present invention will now be described. The excitation light beams emitted at the same frequency by the excitation light sources 6A and 6B are composed by maintaining both beams at the polarized state so as to compensate the fluctuation due to interference, and supplied to the optical fiber containing rare earth elements 2 after passing through the excitation light multiplexer 10 and the light splitting device 3. Stated another way, the excited light beams emitted from the excitation light sources are multiplexed in the respective polarization states so as not to generate fluctuation of the multiplexed light. Thereafter, a part of the excitation light is split by the optical multiplexing and splitting device 3 and then received by the light receiver 7.

The control operation of the outputs of the excitation light sources 6A and 6B by means of the excitation light source control circuit 8 allows for compensating the fluctuation of the excitation light power due to the polarized light dependence or the temperature characteristics of the excitation light multiplexer 5.

Figure 3:
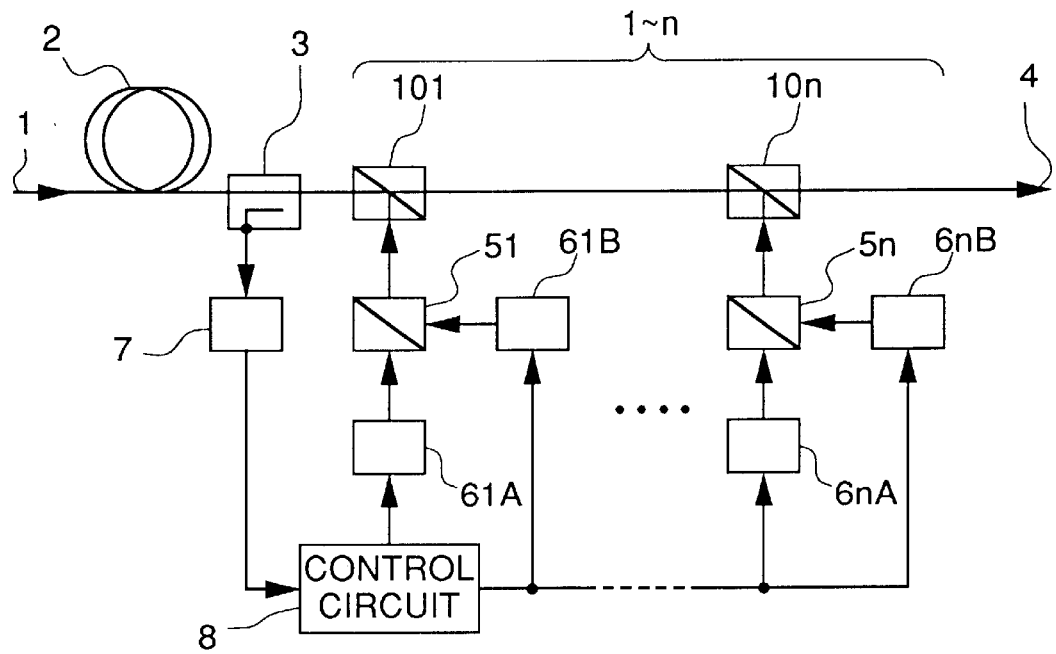
FIG. 3 is a block diagram showing the second embodiment according to the present invention.

FIG. 3 is a block diagram showing the second embodiment according to the present invention, and the same components shown in FIGS. 1 and 2 are denoted by the same numerals. As shown in FIG. 3, the second embodiment is provided with n (n is an integer more than 2) sets of pairs of the excitation light sources 6A and 6B and the excitation light multiplexers 5 and 10, and respective sets are represented by the addition of 1 to n to the reference numerals. In this embodiment, the optical multiplexing and splitting device 3, the light receiver 7, and the control circuit 8 are provided in common to all of those n sets.

Each pair of excitation light beams is emitted from respective pairs of excitation light sources (corresponding to the pair 61A and 61B, for example) and multiplexed by a polarization composition such that a pair of the polarized waves with the same wavelength do not suffer from mutual interference. The wavelength of the thus multiplexed light beams of the respective pairs of excitation light beams is set in the absorption band of the optical fiber, but slightly shifted from those of other multiplexed light beams so as not to be affected by others.

Figure 4:
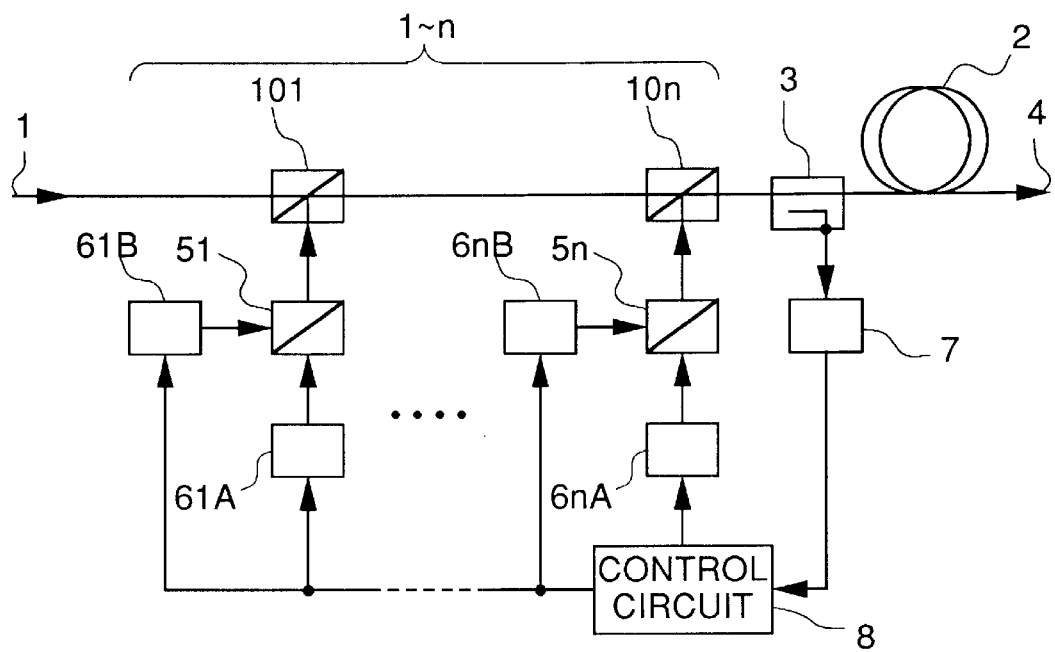
FIG. 4 is a block diagram showing the third embodiment according to the present invention.

FIG. 4 is a block diagram showing the third embodiment according to the present invention, and the same components as those shown in FIG. 3 are denoted by the same numerals. The light amplifier of this embodiment is a forward excitation type for the additive containing optical fiber in contrast to the backward excitation type structure shown in FIG. 3.

Figure 5:
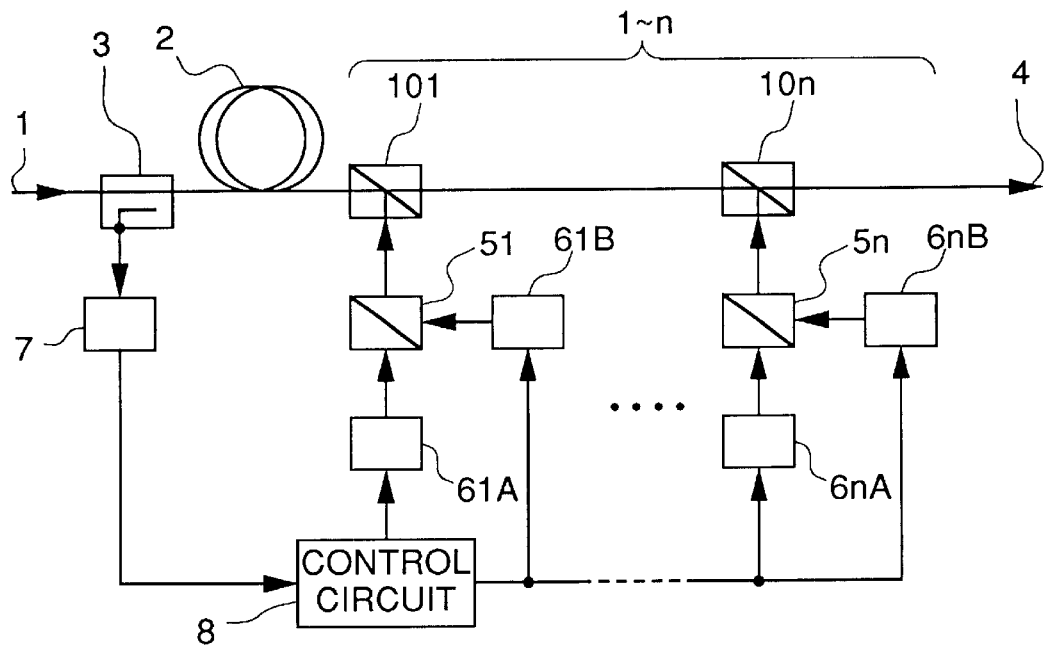
FIG. 5 is a block diagram showing the fourth embodiment according to the present invention.

FIG. 5 is a diagram showing the fourth embodiment of the present invention. The feature of the fourth embodiment is that the optical splitting device 3 for splitting the excitation light is disposed before the additive containing optical fiber 2 in the formation shown in FIG. 3.

Figure 6:
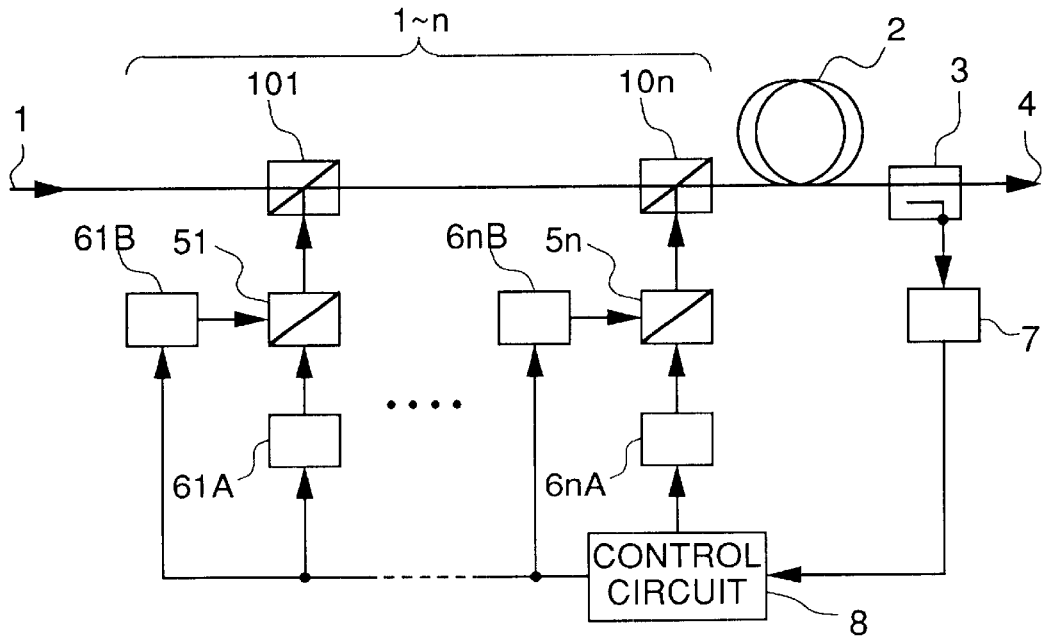
FIG. 6 is a block diagram showing the fifth embodiment according to the present invention.

FIG. 6 is a diagram showing the fifth embodiment of the present invention. The feature of the fifth embodiment is that the optical splitting device 3 for splitting the excitation light is disposed at the backside of the additive containing optical fiber 2 in the formation shown in FIG. 4.

According to the present invention, the effect of the present invention is that, since the excitation light level after passing the excitation light multiplexer is controlled at constant level despite the tracking error of the excitation light sources, the excitation light level is accurately controlled by compensating the fluctuation of the excitation light even when the excitation light level fluctuates due to temperature characteristic or the polarization light dependence of the excitation light sources and the excitation light multiplexer.

The effect of the present invention is that the total level of the light power can be controlled at a constant level when a plurality of excitation light sources are used by compensating the fluctuation of the total level so as to control the total level of the excitation light emitted by a plurality of light sources.

What is claimed is:

1. A light amplifier comprising:
   an optical fiber containing a rare earth element additive;
   a plurality of excitation light sources for generating excitation light beams for said optical fiber;

an excitation light multiplexing and splitting means for multiplexing said plurality of excitation light beams at each polarization state such that each polarized plane does not interfere with each other and for splitting an excitation light beam supplied to said optical fiber after multiplexing said plurality of excitation light beams and after passing through said optical fiber;

a control means for controlling the output level of each of the excitation light sources in response to the excitation light beams split by said excitation light multiplexing and splitting means.

2. A light amplifier according to claim 1, wherein said excitation light multiplexing and splitting means is disposed at the output portion of said optical fiber.

3. A light amplifier according to claim 1, wherein said excitation light multiplexing and splitting means is disposed at the input portion of said optical fiber.

4. A light amplifier according to claim 1, wherein said excitation light source comprises a pair of excitation light sources and a light multiplexing means for multiplexing said pair of light beams emitted from said pair of excitation light sources.

5. A light amplifier according to claim 1, wherein said light amplifier comprises a plurality of sets of the combination of a pair of the light emission sources and the light multiplexer.

6. A light amplifier according to claim 1, wherein said excitation light multiplexing and splitting means is separated into a light multiplexing portion and a light splitting portion, the light multiplexing portion is disposed at the output portion of the optical fiber, and the light splitting portion is disposed at the input portion of the optical fiber.

7. A light amplifier according to claim 1, wherein said excitation light multiplexing and splitting means is separated into a light multiplexing portion and a light splitting portion, the light multiplexing portion is disposed at the input portion of the optical fiber, and the light splitting portion is disposed at the output portion of the optical fiber.

8. A light amplifier according to claim 1, wherein said excitation light sources include a pair of excitation light sources which emit respective light beams, the wavelengths of which are identical to each other and which are synthesized by the polarization composition.

9. A light amplifier according to claim 1, wherein said excitation light sources include a plurality of sets of pairs of excitation light sources and each of said plurality of sets of pairs of the excitation light sources emits light beams having different wavelengths from each other in the absorption band of the optical fiber so as not to interfere with another beam.

10. A light amplifier comprising:

an optical fiber;

a plurality of excitation light sources which generate excitation light beams;

an excitation light multiplexer which multiplexes the plurality of excitation light beams at each polarization state such that respective polarized planes do not interfere with each other thereby producing multiplexed light beams, said multiplexer forwards the multiplexed light beams to the optical fiber;

a splitter which splits at least a portion of the multiplexed light beams from the optical fiber; and a controller which controls an output level of each of the excitation light sources based on the multiplexed light beams split by the splitter.

* * * * *